United States Patent
Kolb et al.

(10) Patent No.: US 10,729,123 B2
(45) Date of Patent: Aug. 4, 2020

(54) SYSTEMS AND METHODS FOR DETERMINING DISPENSE VOLUME OF FLUID PER TARGET FOR AN AGRICULTURAL FLUID APPLICATION SYSTEM

(71) Applicant: Capstan Ag Systems, Inc., Topeka, KS (US)

(72) Inventors: Troy C. Kolb, Hiawatha, KS (US); Adam Madison, Lancaster, KS (US); Tyron Johnson, Coffeyville, KS (US); Kent Dieball, Stillwater, OK (US); Anthony Moeder, Topeka, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 8 days.

(21) Appl. No.: 16/173,707

(22) Filed: Oct. 29, 2018

(65) Prior Publication Data
US 2019/0124907 A1 May 2, 2019

Related U.S. Application Data

(63) Continuation of application No. 15/343,713, filed on Nov. 4, 2016, now Pat. No. 10,111,415.
(Continued)

(51) Int. Cl.
*A01M 7/00* (2006.01)
*A01C 21/00* (2006.01)
(Continued)

(52) U.S. Cl.
CPC .......... *A01M 7/0089* (2013.01); *A01C 7/206* (2013.01); *A01C 21/00* (2013.01); *A01C 23/023* (2013.01);
(Continued)

(58) Field of Classification Search
CPC .... A01M 7/0089; B05B 12/122; B05B 12/16; B05B 15/68; B05B 12/02; B05B 1/3053;
(Continued)

(56) References Cited

U.S. PATENT DOCUMENTS

| | | | |
|---|---|---|---|
| 4,220,998 A * | 9/1980 | Kays | A01M 7/0089 239/162 |
| 5,134,961 A | 8/1992 | Giles et al. | |

(Continued)

OTHER PUBLICATIONS

Curley, Robert G. et al., "Planter Attachment for the Spot Application of Soil Anticrustant," ASAE Meeting Presentation, Jun. 23-26, 1991, 11 pgs.
(Continued)

*Primary Examiner* — Rodney A Butler
(74) *Attorney, Agent, or Firm* — Armstrong Teasdale LLP

(57) ABSTRACT

A spraying system for spraying a fluid includes a nozzle, a valve configured to control fluid flow through the nozzle, a sensor configured to transmit a detection signal upon detection of a target, a user interface configured to receive application rate information and target population information from an operator, and a control system communicatively coupled to the user interface, the sensor, and the valve. The control system is configured to determine a specific volume of fluid per target to be dispensed by the valve based on the application rate information and the target population information input to the user interface, and to transmit a control signal to the valve at least in part in response to receiving the detection signal. The control signal actuates the valve such that the determined specific volume of fluid per target is sprayed by the nozzle on or adjacent to the target.

20 Claims, 7 Drawing Sheets

Related U.S. Application Data

(60) Provisional application No. 62/301,833, filed on Mar. 1, 2016.

(51) Int. Cl.
| | | |
|---|---|---|
| *A01C 23/02* | (2006.01) | |
| *B05B 12/12* | (2006.01) | |
| *A01C 7/20* | (2006.01) | |
| *A01C 23/04* | (2006.01) | |
| *B05B 15/68* | (2018.01) | |
| *A01C 7/06* | (2006.01) | |
| *B05B 1/30* | (2006.01) | |
| *B05B 12/02* | (2006.01) | |

(52) U.S. Cl.
CPC .......... *A01C 23/047* (2013.01); *B05B 12/122* (2013.01); *B05B 15/68* (2018.02); *A01C 7/06* (2013.01); *B05B 1/3053* (2013.01); *B05B 12/02* (2013.01)

(58) Field of Classification Search
CPC ..... A01C 23/023; A01C 21/00; A01C 23/047; A01C 7/206; A01C 7/06
See application file for complete search history.

(56) References Cited

U.S. PATENT DOCUMENTS

| | | |
|---|---|---|
| 5,475,614 A * | 12/1995 | Tofte .................. A01M 7/0089 700/283 |
| 5,653,389 A | 8/1997 | Henderson et al. |
| 5,704,546 A | 1/1998 | Henderson et al. |
| 7,370,589 B2 | 5/2008 | Wilkerson et al. |
| 8,074,585 B2 | 12/2011 | Wilkerson et al. |
| 8,191,795 B2 | 6/2012 | Grimm et al. |
| 8,523,085 B2 | 9/2013 | Grimm et al. |
| 9,226,442 B2 | 1/2016 | Grimm et al. |
| 2006/0273189 A1 | 12/2006 | Grimm et al. |
| 2012/0228395 A1 | 9/2012 | Needham et al. |
| 2013/0269578 A1 | 10/2013 | Grimm et al. |
| 2014/0299673 A1 | 10/2014 | Grimm et al. |
| 2016/0015020 A1 | 1/2016 | Needham et al. |
| 2016/0073576 A1 | 3/2016 | Grimm et al. |

OTHER PUBLICATIONS

Hancock, John A., "Design and Evaluation of a Seed-Specific Applicator for In-Furrow Chemical Application," Thesis for Master of Science Degree, University of Tennessee, Knoxville, May 2003, 172 pgs.

\* cited by examiner

SYSTEMS AND METHODS FOR DETERMINING DISPENSE VOLUME OF FLUID PER TARGET FOR AN AGRICULTURAL FLUID APPLICATION SYSTEM

CROSS-REFERENCE TO RELATED APPLICATIONS

This application is a continuation of U.S. patent application Ser. No. 15/343,713, filed on Nov. 4, 2016, which claims priority to U.S. Provisional Patent Application Ser. No. 62/301,833, filed on Mar. 1, 2016, the disclosures of which are hereby incorporated by reference in their entirety.

BACKGROUND

The field of this disclosure relates generally to systems for applying fluid to agricultural fields and, more particularly, to systems and methods for determining and visually depicting a spray band length relative to a seed or plant.

In the agricultural industry, agricultural fluids are commonly applied to fields for a variety of reasons. For example, plants and plant precursors (e.g., seeds) are often sprayed with an agricultural fluid at the time of planting to enhance germination and early development. Agricultural fluids include, without limitation, spray fertilizers, pesticides, insecticides, fungicides, growth promoter, and/or growth regulator.

Typically, systems for applying fluid to fields include a manifold, e.g., a boom, and a plurality of nozzle assemblies that receive the fluid from the manifold for applying to the field. In at least some known systems, the fluid is delivered to the manifold through an inlet located between opposed ends of the manifold. The fluid travels longitudinally through the manifold from the inlet toward the opposed ends. As the fluid flows towards the opposed ends, a portion of the fluid is directed out of the manifold towards the nozzle assemblies for application to the fields. Typical systems for applying fluid to fields do not provide a system or method for determining a spray band length and distance relative to a seed or plant based on information supplied, at least in part, from an operator. Typical systems further do not display a spray band length and distance relative to a seed or plant visually to the operator.

Accordingly, it is desirable to provide a system that determines a spray band length for a seed planting and agricultural spraying system. Moreover, the system should facilitate conveyance of this information to an operator of the seed planting and agricultural spraying system.

BRIEF SUMMARY

In one aspect, a spraying system for spraying a fluid is provided. The spraying system includes a nozzle assembly configured to spray the fluid in response to receiving a control signal, a sensor configured to transmit a detection signal upon detection of a target, and a user interface configured to receive input from an operator. The spraying system further includes a control system communicatively coupled to the sensor to receive the detection signal from the sensor and configured to transmit the control signal to the nozzle assembly at least in part in response to reception of the detection signal. The control system is further configured to determine a fluid band length and an offset distance of the fluid band length from the target based at least in part on information input by the operator to the user interface. The user interface displays a graphic representation of the fluid band length and the offset distance relative to the target.

In another aspect, a method for determining and displaying characteristics of a spraying system to a user of the spraying system is provided. The spraying system is configured to apply fluid to a target with a nozzle assembly including a nozzle and a valve. The method includes receiving, at a control system configured to control the nozzle assembly, information from a user interface communicatively coupled to the control system. The information includes target population information, application rate information, pressure set point information, and target speed information corresponding to a target travel speed of the spraying system. The method also includes determining, based at least in part on the information received from the user interface, a fluid band length of fluid dispensed by the nozzle assembly and an offset distance between the fluid and the target, and displaying, on the user interface, a graphic representation of the fluid band length and the offset distance relative to the target.

In a further aspect, a planter system for planting seeds and spraying a fluid is provided. The planter system includes a seeder assembly including a seed meter configured to dispense seeds through a seed tube. The planter system also includes a nozzle assembly configured to spray the fluid in response to receiving a control signal, a sensor configured to transmit a detection signal upon detection of a seed passing through the seed tube, and a user interface configured to receive input from an operator. The planter further includes a control system communicatively coupled to the sensor to receive the detection signal from the sensor. The control system is configured to transmit the control signal to the nozzle assembly at least in part in response to reception of the detection signal, and to determine a fluid band length and an offset distance of the fluid band length from a target seed dispensed from the planter system based at least in part on information input by the operator to the user interface. The user interface displays a graphic representation of the fluid band length and the offset distance relative to the target seed.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION OF THE DRAWINGS

Figure 1:
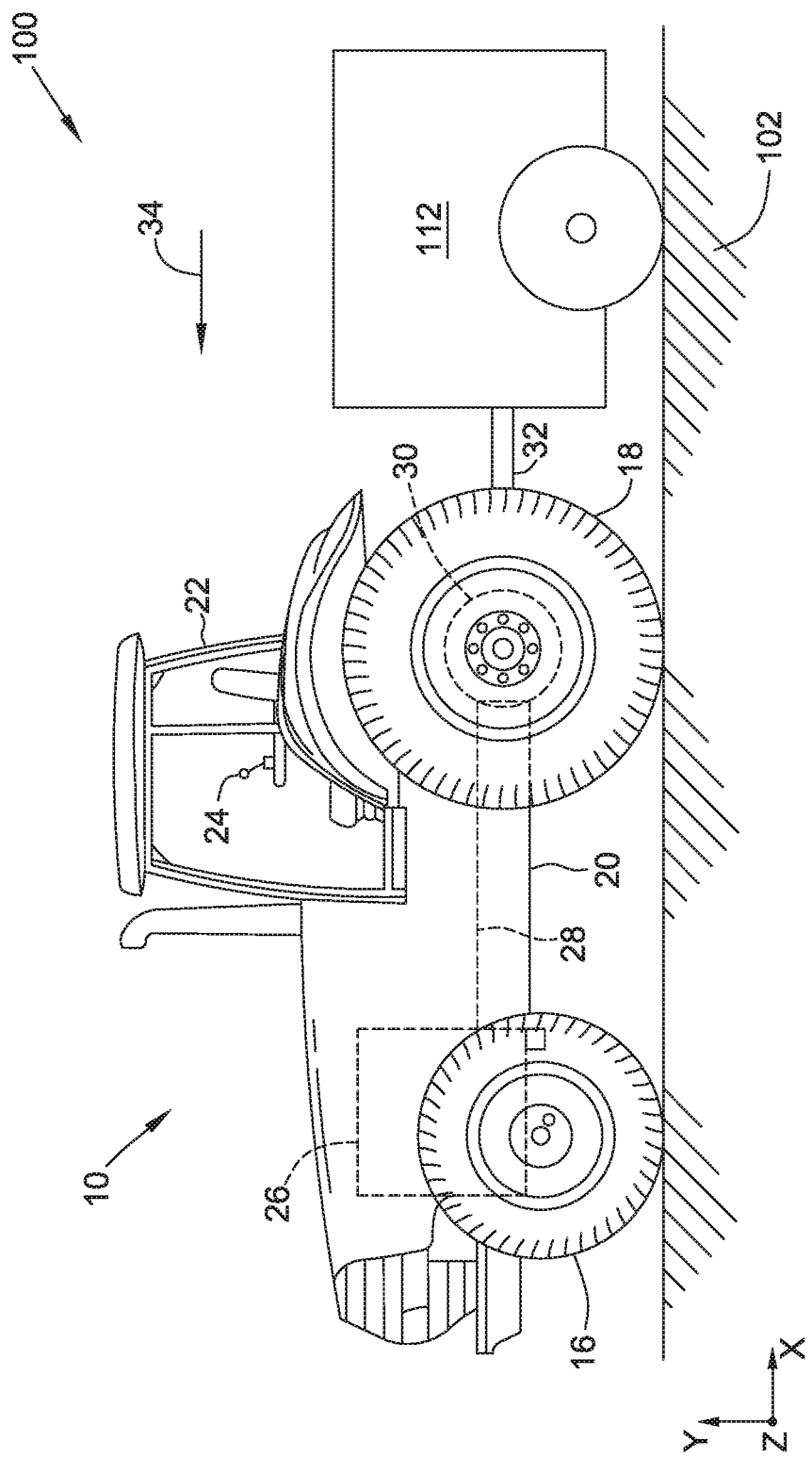
FIG. 1 is a side schematic view of an embodiment of a seed planting and agricultural spraying system connected to a motorized vehicle.

Referring now to FIG. 1, a seed planting and agricultural spraying system, or planter, 112 (shown schematically in FIG. 1) is shown connected to a motorized vehicle 10. The motorized vehicle 10 is coupled, fixedly or removably, to seed planting and agricultural spraying system 112 and provides locomotion to seed planting and agricultural spraying system 112 and/or otherwise controls components of seed planting and agricultural spraying system 112. In the illustrated embodiment, motorized vehicle 10 is a tractor, although any other suitable vehicles or machines may be used to provide locomotion to seed planting and agricultural spraying system 112 and provide for control of seed planting and agricultural spraying system 112. In some embodiments, one or more components of the seed planting and agricultural spraying system 112 may be incorporated into the motorized vehicle 10 without departing from some aspects of this disclosure.

As shown in FIG. 1, the motorized vehicle 10 includes a pair of front wheels 16, a pair or rear wheels 18, and a chassis 20 coupled to and supported by the wheels 16, 18. A cab 22 is supported by a portion of the chassis 20 and houses various control devices 24 for permitting an operator to control operation of the motorized vehicle 10. In some embodiments, control devices 24 may also permit control of the seed planting and agricultural spraying system 112. The motorized vehicle 10 also includes an engine 26 and a transmission 28 mounted on the chassis 20. The transmission 28 is operably coupled to the engine 26 and provides variably adjusted gear ratios for transferring engine power to the wheels 18 via an axle/differential 30. Additionally, as shown in FIG. 1, the motorized vehicle 10 may be configured to be coupled to the seed planting and agricultural spraying system 112 via a suitable coupling 32 such that the vehicle 10 may pull the seed planting and agricultural spraying system 112 as it moves in a travel direction (indicated by arrow 34) along a field 102. It should be understood that any other suitable vehicle or machine may be used to provide locomotion to seed planting and agricultural spraying system 112 and provide for control of seed planting and agricultural spraying system 112. In some embodiments, for example, vehicle 10 may include tracks instead of or in addition front wheels 16 and/or wheels 18. Additionally, in some embodiments, vehicle 10 may be an autonomous vehicle with no cab 22.

Figure 2:
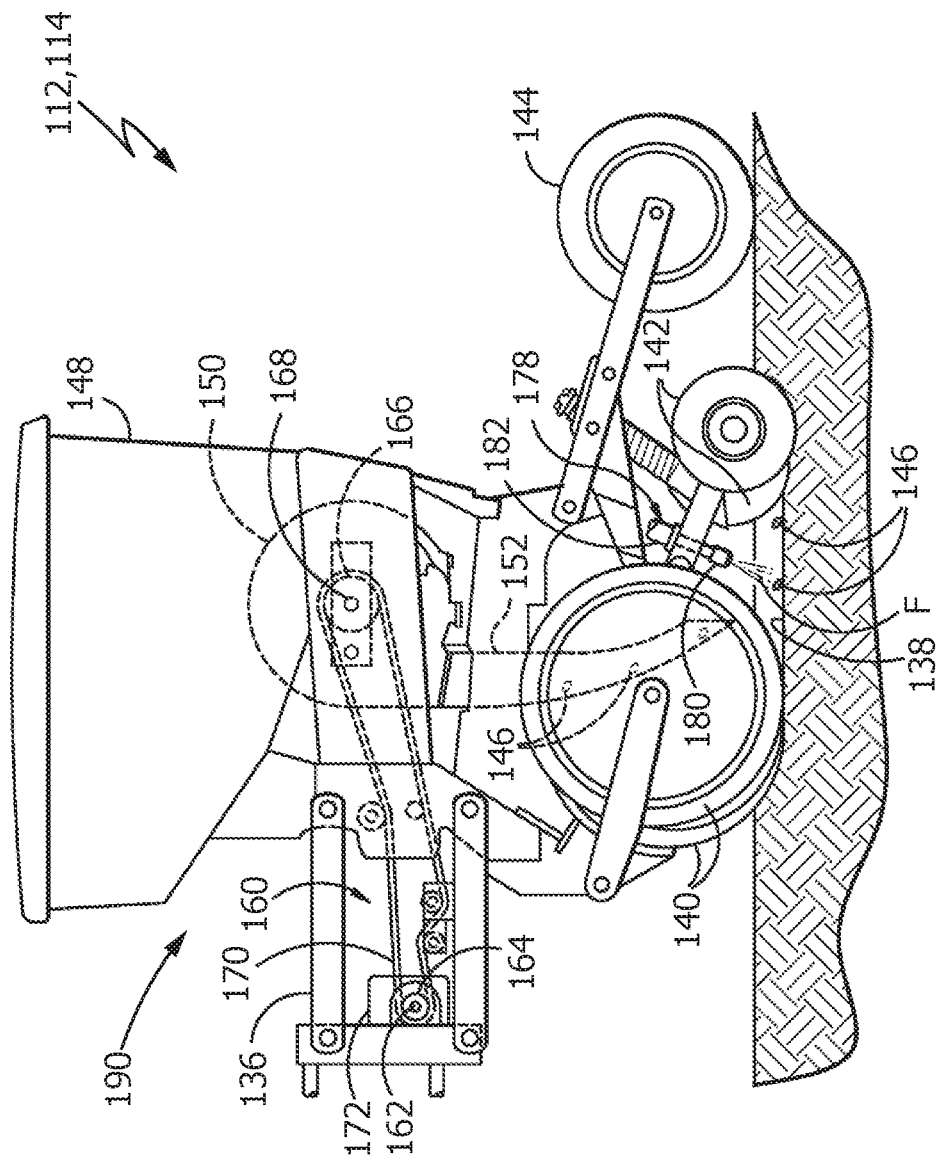
FIG. 2 is a side view of a portion of the seed planting and agricultural spraying system shown in FIG. 1.

Referring to FIG. 2, seed planting and agricultural spraying system includes a plurality of row units 114. Row units 114 are configured to at least spray a fluid on and/or adjacent to seeds and/or plants and, in some embodiments, are configured to plant seeds and spray the fluid on and/or adjacent to the seeds. Seed planting and agricultural spraying system 112 further includes a control system and a user interface (shown in FIGS. 4 and 5) for controlling row units 114 and displaying related information. The control system and user interface determine a spray band length and a position of the spray band relative to a seed or plant, and convey this information to an operator of the seed planting and agricultural spraying system. The control system and user interface are located in a cab or other occupant space (e.g., cab 22) for the operator of seed planting and agricultural spraying system 112. In alternative embodiments, the control system and/or user interface are located remote from row units 114 and an associated vehicle and allow for remote control of row units 114.

Row unit 114 is configured to create a furrow 138 using a furrow creation device, to meter and dispense seeds into the furrow 138 from a seed hopper 148 using a seed tube 152, and to spray a fluid F using a nozzle assembly 178. Row unit 114 may include any number of components such that row unit 114 performs these functions for a single row or a plurality of rows simultaneously. For example, in some embodiments, row unit 114 includes a plurality of furrow creation devices, seed tubes 152 fed from seed hoppers 148 (e.g., each seed hopper 148 fed from a single, shared master seed hopper, not shown), and nozzle assemblies 178 along the track of row unit 114 and planter 112. Planter 112 includes a frame 136 extending along the width of the planter 112 (e.g., in a direction transverse to the travel of planter 112, in other words parallel to the track length of planter 112) that supports row units 114.

The furrow creation device of planter 112 is configured to create a trench or furrow 138 within the ground for planting seeds 146. In several embodiments, the furrow creation device includes a pair of laterally spaced opening discs 140, a pair of laterally spaced closing discs 142 and a press wheel 144. The opening discs 140 are configured to open a furrow 138 within the ground. Seeds 146 are deposited into the furrow 138 (e.g., by seed tube 152), and closing discs 142 are configured to close furrow 138 over seeds 146. Press wheel 144 is configured to compact the soil that has been closed over seeds 146. In alternative embodiments, furrow creation device may include other suitable components for creating furrow 138. In further alternative embodiments, planter 112 does not include a furrow creation device but rather plants and/or sprays in an existing furrow 138 (e.g., created by another machine).

Row unit 114 includes a seeder assembly 190 including seed hopper 148, a seed meter 150, and seed tube 152. Seed hopper 148, seed meter 150, and seed tube 152 are configured to dispense seeds 146 into furrow 138. For example, seed hopper 148 is any suitable container or other storage device configured for storing and dispensing seeds 146 into seed meter 150. Seed meter 150 is any suitable seed meter configured to dispense seeds 146 into seed tube 152 at a metered rate. In one embodiment, seed meter 150 includes a housing and a seed plate or disc rotatably supported within the housing. The seed disc includes a plurality of indentions, channels and/or other suitable recessed features that are spaced apart from one another around the seed disc (e.g., in a circular array) to allow seeds 146 to be dispensed at a given frequency. Specifically, each recessed feature is configured to grab a single seed 146 (e.g., via a vacuum applied to the recessed feature) as such recessed feature is rotated past the location at which seeds 146 are fed into the housing from seed hopper 148. As the seed disc is rotated, seeds 146 are carried by the recessed features and dispensed into seed tube 152. The metered rate may be predetermined, set, changed, or otherwise controlled (e.g., by the control system of planter 112 or mechanically based on a rate of travel of row unit 114). Seeds 146 are dispensed from seed tube 152 into furrow 138. For example, at a given rotational speed for the seed disc, the seed meter 150 dispenses seeds 146 at a constant frequency. When planter 112 travels at a constant speed, seeds 146 are spaced apart equally from one another within furrow 138. As the travel speed of the planter 112 increases or decreases, the rotational speed of the seed disc must also be increased or decreased to maintain equal spacing or a predetermined spacing of seeds 146 within the furrow 138. Such variation of the rotational speed of the seed disc is provided by a drive system 160 and/or controlled by a control system of planter 112.

Drive system 160 is or includes any suitable device and/or combination of devices configured to rotate the seed disc of seed meter 150. In the illustrated embodiment, for example, drive system 160 is a sprocket/chain arrangement including a drive shaft 162, a first sprocket 164 coupled to drive shaft 162, a second sprocket 166 coupled to the seed disc (e.g., via a shaft 168) and a chain 170 coupled between the first and second sprockets 164, 166. Drive shaft 162 is configured to rotate first sprocket 164, which, in turn, rotates second sprocket 166 via chain 170. Rotation of second sprocket 166 results in rotation of shaft 168 and, thus, rotation of the seed disc within the housing of seed meter 150. Drive system 160 further includes a motor 172 (e.g., an electric or hydraulic motor) rotatably coupled to drive shaft 162 that is configured to be controlled by the control system of planter 112. Specifically, the control system is configured to receive signals associated with the travel speed of planter 112 from a sensor or other suitable device (e.g., an encoder or shaft sensor, global positioning system receiver, or other device) and regulate the rotational speed of motor 172 based on the travel speed of planter 112 such that a desired seed spacing is achieved or maintained. In alternative embodiments, drive system 160 is or includes other components or devices. For example, drive system 160 may be configured to rotate the seed disc through a connection with one or more wheels or other rotating features of planter 112. A transmission, clutch, and/or other components may be used to regulate the rotational speed of the seed disc and therefore achieve or maintain desired seed spacing.

In alternative embodiments, row unit 114 is or includes other suitable components for dispensing seeds 146. In further alternative embodiments, planter 112 does not include seed hopper 148, a seed meter 150, seed tube 152, or other components for dispensing seeds 146, and instead sprays existing seeds 146 or existing plants. In such embodiments, row unit 114 does not include seeder assembly 190.

Row unit 114 further includes at least one nozzle assembly 178 configured to spray fluid F. Nozzle assembly 178 sprays fluid F, or a combination of fluids, on, adjacent to, or otherwise in relation to seeds 146 dispensed by seed tube 152 or existing plants. Nozzle assembly 178 includes a spray nozzle 180 and a valve 182 (e.g., a solenoid valve). Nozzle 180 is any suitable spray nozzle suitable for an agricultural spraying system. Valve 182 is configured to be mounted to and/or integrated within a portion of spray nozzle 180 or nozzle assembly 178 using any suitable mounting configuration and/or any other suitable configuration that permits control of the flow of fluid F through the nozzle 180. For example, valve 182 is a solenoid valve positioned relative to spray nozzle 180 and controlled by the control system of planter 112 such that flow of fluid F through spray nozzle 180 is modified using pulse width modulation (PWM) control of valve 182. In other embodiments, valve 182 may be located remote from nozzle 180. In some embodiments, for example, valve 182 may be mounted or coupled to the boom pipe or manifold used to supply fluid to nozzle assemblies 178. In some embodiments, nozzle assembly 178 also includes a spray tip 234 (shown in FIG. 3) coupled to spray nozzle 180 and configured to produce a desired spray pattern.

Fluid F is supplied to nozzle assembly 178 from any suitable fluid source (not shown), such as a fluid tank, via a pipe such as a boom pipe, manifold, or other suitable flow conduit. In addition, a pump (not shown), such as a centrifugal pump, may be positioned upstream of the nozzle assembly 178 for pumping fluid F from the fluid source to the nozzle assembly 178. Alternatively, the pump may be positioned between a fluid reservoir and a boom pipe which is in fluid communication with a plurality of nozzle assemblies 178. The pump pressurizes the boom pipe with fluid from the reservoir and nozzle assembly 178 and/or valves 182 controls flow of the pressurized fluid through spray nozzle 180. In some embodiments, row unit 114 includes a plurality of nozzle assemblies 178 for spraying fluid in parallel rows. In further embodiments, a single nozzle assembly 178 is configured to spray fluid in two or more parallel rows. In still further embodiments, row unit 114 includes a plurality of nozzle assemblies 178 positioned to spray a single row (e.g., furrow). For example, each nozzle assembly 178 may spray a different fluid and may be controlled, by the control system of planter 112, together or individually (e.g., allowing for different spray band lengths and/or offset distances from seeds 146).

Figure 3:
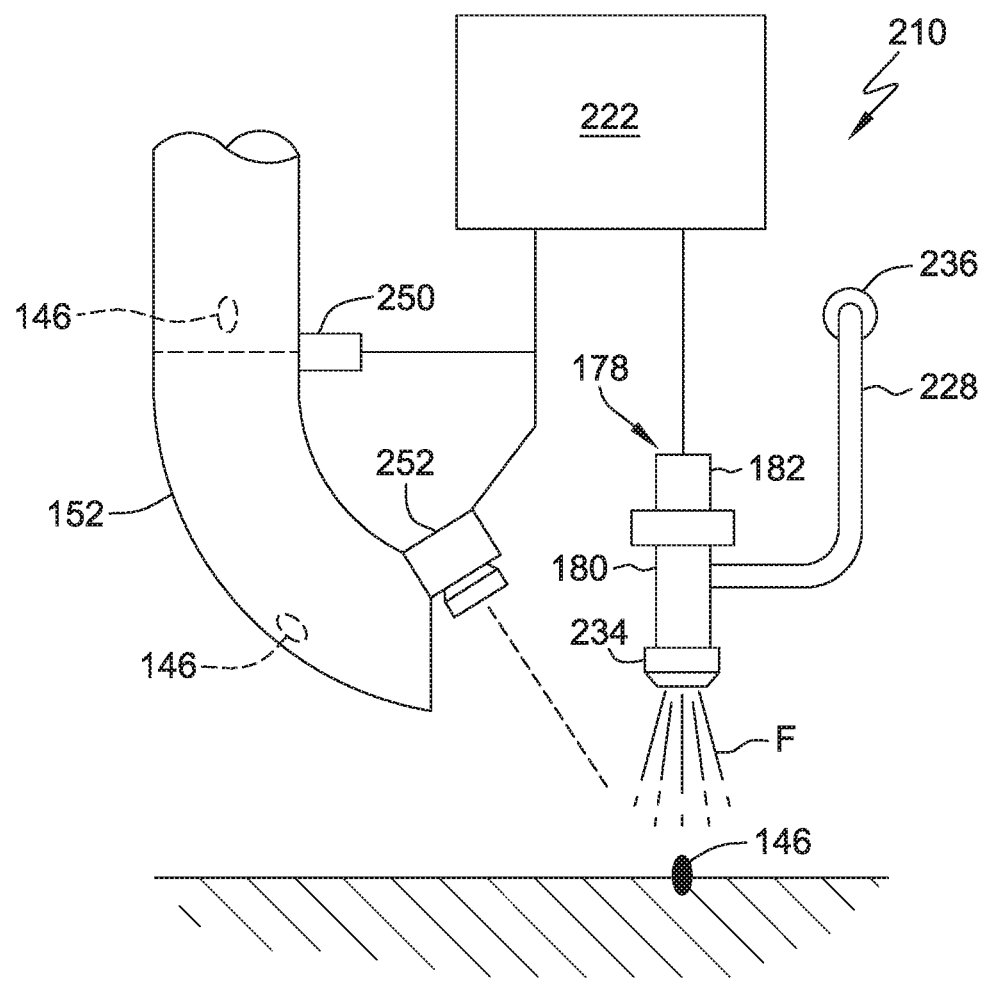
FIG. 3 is schematic view of a portion of the seed planting and agricultural spraying system shown in FIGS. 1 and 2.

Referring now to FIG. 3, seed planting and agricultural spraying system 112 further includes a spraying assembly 210 that includes a manifold 236 (e.g., a boom pipe) which supplies fluid F and/or other fluids to nozzle assembly 178. Manifold 236 is coupled to a pump and/or fluid reservoir and is pressurized (e.g., by the pump). Manifold 236 is coupled to nozzle assembly 178 by a suitable fluid conduit 228, such as a pipe or hose. Valve 182 of nozzle assembly 178 controls the flow of fluid F from fluid conduit 228 to nozzle 180 and spray tip 234 as described herein. For example, a controller 222 and/or the control system of planter 112 sends a pulse width modulated signal to a solenoid valve 182 to control flow of fluid F to nozzle 180. Spray tip 234 is configured to produce a specified spray pattern. The spray pattern may be pressure dependent. Controller 222 and/or the control system may be configured to control the pressure in manifold 236 to achieve a desired spray pattern in combination with spray tip 234. In some embodiments, spray tip 234 is interchangeable with other spray tips configured to produce varying spray patterns. The type of spray tip 234 and/or parameters describing the spray pattern produced by spray tip 234 may be entered into controller 222 and/or the control system by an operator via a user interface, for example, using a tip calibration screen (shown in FIG. 7). Other operating parameters, such as fluid flow rate, fluid pressure, seed population, and speed or velocity of the planter 112 or row unit 114, may be determined by and/or input to controller 222 and/or the control system (e.g., by an operator using a user interface). Controller 222 and/or the control system may use this information in determining spray band length of fluid F and/or the offset of the spray band from seeds 146. Spray band length refers to the length of the fluid spray band, measured in the direction of travel of row unit 114 and planter 112, discharged or dispensed by nozzle assembly 178 during a single on-cycle of valve 182.

Still referring to FIG. 3, in some embodiments, spraying assembly 210, including nozzle assembly 178, is configured to spray fluid F on and/or adjacent to seed 146 using, in part, one or more sensors. In the illustrated embodiment, for example, spraying assembly 210 includes a seed sensor 250. Seed sensor 250 is configured to sense, at least, when seed 146 passes through and/or exits seed tube 152. For example, sensor 250 may be an optical sensor (e.g., a camera) or a beam break sensor (e.g., infrared beam break sensor) producing a beam which when broken sends a signal (e.g., a change in voltage). Seed sensor 250 may be a mechanical sensor which at least partially obstructs seed tube 152 and that produces a signal (e.g., change in voltage) when seed 146 contacts or moves the mechanical sensor. In alternative embodiments, other suitable sensor(s) are used to detect when seed 146 exits seed tube 152. In further embodiments, sensor 250 is configured to determine a location of seed 146 in furrow 38. For example, sensor 250 may be or include a camera which images seed 146 in furrow 38. Additionally or alternatively, spraying assembly 210 may include a second sensor, such as a camera 252, configured to capture one or more images of each seed 146 after it is dispensed from seed tube 152 and/or as it is being sprayed by the nozzle assembly (ies) 178. Additional details and operation of seed sensor 250 and camera 252 are described in U.S. patent application Ser. No. 13/857,348, filed Apr. 5, 2013, the disclosure of which is hereby incorporated by reference in its entirety. Using image recognition techniques, distance calculating techniques, and/or a time when seed 146 leaves seed tube 152, the location of seed 146 may be determined. Sensor(s) 250, 252 may send a signal to a controller 222 and/or a control system (shown in FIG. 5) of planter 112 for use in controlling spraying assembly 210, such as when to actuate valve 180 on nozzle assembly 178.

Controller 222 and/or the control system of planter 112 use information received from sensor(s) 250, 252 to control spraying assembly 210. Controller 222 and/or the control system of planter 112 controls nozzle assembly 178 to spray fluid F on or adjacent to seed 146.

Controller 222 and/or the control system of planter 112 may be configured to determine when to open and close valve 182 by analyzing various operating parameters of planter 112, which may be pre-stored within the controller's memory and/or received by the controller 222 and/or control system as an input. For example, operating parameters may include, but are not limited to, the vertical distance from the top of seed tube 152 to furrow 138, the vertical distance each seed 146 falls between the sensor 250 and the furrow 138, the vertical distance between an outlet of nozzle assembly 178 (e.g., spray tip 234, if connected) and furrow 138, a horizontal distance between an outlet of seed tube 152 and an outlet of nozzle assembly 178, an angle at which nozzle assembly 178 is oriented relative to field 102, the speed of row unit 114 and/or any other suitable operating parameters. Based on such analysis, controller 222 and/or the control system may be configured to calculate a suitable time delay for actuating valve 182 (e.g., the amount of time between when the sensor 250 detects a seed 146 and when valve 182 is opened to spray fluid F on and/or adjacent to each seed 146).

Controller 222 and/or the control system of planter 112 may also or alternatively be configured to control the operation of valve 182 such that a specific volume of fluid F is applied on and/or adjacent to each seed 146. Controller 222 and/or the control system may be configured to analyze one or more operating parameters in order to determine the duration of a valve pulse (e.g., the amount of time valve 182 is opened) to achieve a desired spray volume for each seed 146. Such operating parameters may include, but are not limited to, the pressure of the fluid F supplied to valve 182, the configuration of valve 182 (e.g., the sizes of the inlet and/or outlet of the valve 182), the configuration of nozzle assembly 178 (e.g., spray tip 234 orifice size), the speed V of row unit 114 and/or any other suitable operating parameters. Controller 222 and/or the control system may be configured to control the duration of the valve pulse in a manner that allows the same volume of fluid F to be sprayed on and/or adjacent to each seed 146.

Controller 222 and/or the control system of planter 112 may also or alternatively be configured to control the operation of valve 182 such that fluid F is applied beginning at a specific offset distance from seed 146, an existing plant, or other target. For example, the offset distance may be measured from seed 146 extending in the direction of travel of row unit 114 and planter 112. An offset distance of 0 results in fluid F being applied substantially at seed 146 with fluid extending a spray band length in the direction of travel. An offset distance of greater than 0 results in an offset between seed 146 and the point at which fluid F is applied, such that a gap exists between seed 146 and fluid F, with fluid F extending from the end of the gap and in the direction of travel. An offset distance of less than 0 results in a negative offset such that fluid F is applied on or under seed 146 and extends in both directions from seed 146 (e.g., the direction of travel and the opposite direction). The offset distance may be provided to controller 222 and/or the control system from an operator via a user interface (shown in FIGS. 4 and 5). Controller 222 and/or the control system may be configured to control the timing of the valve pulse sent to valve 182 such that valve 182 opens and closes at a time relative to seed 146 being dispensed that generates the offset of fluid F described herein.

Alternatively, controller 222 and/or the control system may be configured to implement a fixed application approach, wherein valve 182 is operated at a constant pulse duration. In such an embodiment, the specific volume of fluid F applied on and/or adjacent to each seed 146 may generally vary depending on the speed V of row unit 114 and/or the pressure of the fluid F supplied to valve 182.

Controller 222 and/or the control system of planter 112 determines the spray band length of fluid F and the position of the spray band relative to seed 146, as described in greater detail with reference to FIGS. 5 and 6. Controller 222 and/or the control system of planter 112 displays this information to the operator of planter 112 using a user interface (shown in FIG. 5). Based on this information, the operator may be able to manually adjust the settings of the spraying assembly 210 and/or planter 112 to achieve desired spray characteristics, such as a desired spray band length and/or a desired spacing between the spray band and a seed, plant, or other target ahead of or behind the spray band relative to the direction of travel of row unit 114 and planter 112. For example, an operator may adjust, using the control system, the pressure and/or flow rate of the fluid F supplied to the valve 182, the duration of the valve 182 pulse (e.g., the amount of time valve 182 is open for each spray), the volume of fluid F being sprayed and/or any other suitable operating parameter. The operator may further adjust other settings and/or parameters such as the speed of planter 112 to adjust the spray band length of fluid F and/or the offset of the spray band from seeds 146. In some embodiments, controller 222 and/or the control system of planter 112 display images, captured by sensors 250 and/or 252, of seeds 146 and the spraying of fluid F to an operator of planter 112 allowing for further adjustment of spraying assembly 210 and/or other systems.

Moreover, in one embodiment, the controller 222 and/or the control system may also be configured to control a flow rate of the fluid F supplied to valve 182 by controlling the operation of a suitable flow regulating valve. For example, controller 222 and/or the control system may be configured to determine the flow rate of the fluid F supplied through the fluid conduit 228 based on inputs received from one or more suitable meters and/or sensors positioned upstream of valve 182, such as one or more turbine meters associated with a pump supplying manifold 236, one or more tank level meters associated with a fluid source or reservoir supplying manifold 236, one or more flow meters associated with fluid conduit 228, one or more pressure sensors and/or other sensors. In addition, controller 222 and/or the control system may also be configured to receive user inputs, from a user interface, corresponding to a desired flow rate for spraying assembly 210. Accordingly, based on such inputs, the controller 222 and/or the control system may be configured to control the operation of the flow regulating valve so as to maintain the fluid F supplied to valve 182 at the desired flow rate. Controller 222 and/or the control system of planter 112 may further use these inputs to determine the spray band length of fluid F sprayed by spraying assembly 210.

Further, in one embodiment, controller 222 and/or the control system may also be configured to control the pressure of the fluid F supplied to valve 182. For example, one or more pressure sensors may be configured to monitor the pressure of the fluid F and transmit pressure measurements to controller 222 and/or the control system. The controller 222 and/or the control system may, in turn, be configured to pulse valve 182 at a suitable frequency and/or duty cycle in order to maintain a specific pressure upstream of valve 182, such as within fluid conduit 228 or manifold 236. Such pressure based control may allow controller 222 and/or the control system to vary the amount of fluid F being sprayed on and/or adjacent to each seed 146 while operating valve 182 at a constant pulse duration.

Figure 5:
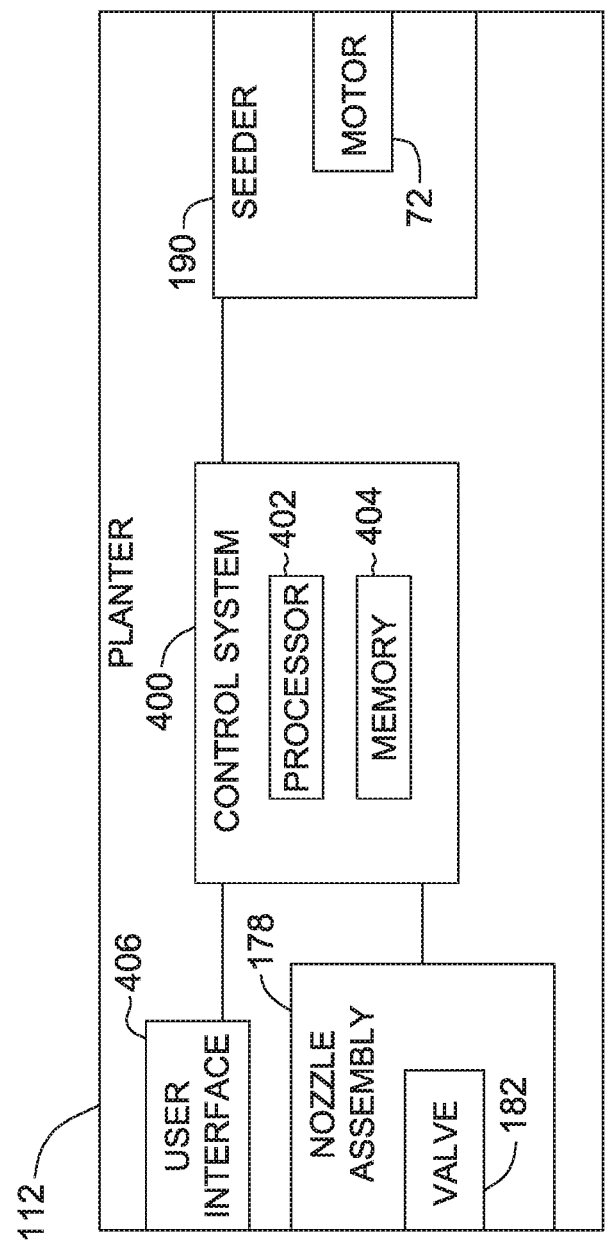
FIG. 5 is a block diagram of the seed planting and agricultural spraying system shown in FIGS. 1 and 2.

Referring now to FIGS. 3 and 5, in some embodiments, controller 222 is implemented as part of control system 400 of planter 112 and is not a standalone controller. In alternative embodiments, controller 222 is in communication with control system 400 of planter 112 (e.g., via a data bus). Controller 222 and/or control system 400 may generally be or include any suitable computer and/or other processing unit, including any suitable combination of computers, processing units and/or the like that may be operated independently or in connection within one another. Controller 222 and/or control system 400 may include one or more processor(s) 402 and associated memory device(s) 404 configured to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, the memory device(s) 404 of the controller 222 and/or control system 400 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s), configure or cause controller 222 and/or control system 400 to perform various functions described herein including, but not limited to, controlling seeder assembly 190 (shown in FIG. 2), controlling the operation of valve 182, calculating time delays for valve 182, controlling a flow rate of the fluid F supplied to valve 182, controlling the pressure of the fluid F supplied to valve 182, determining a spray band length of fluid F, determining a position of the spray band of fluid F (e.g., the coverage on the ground) relative to seed 146, receiving inputs from user interface 406, providing output to an operator via user interface 406, receiving data from sensor(s) 250, and/or various other suitable computer-implemented functions.

Figure 4:
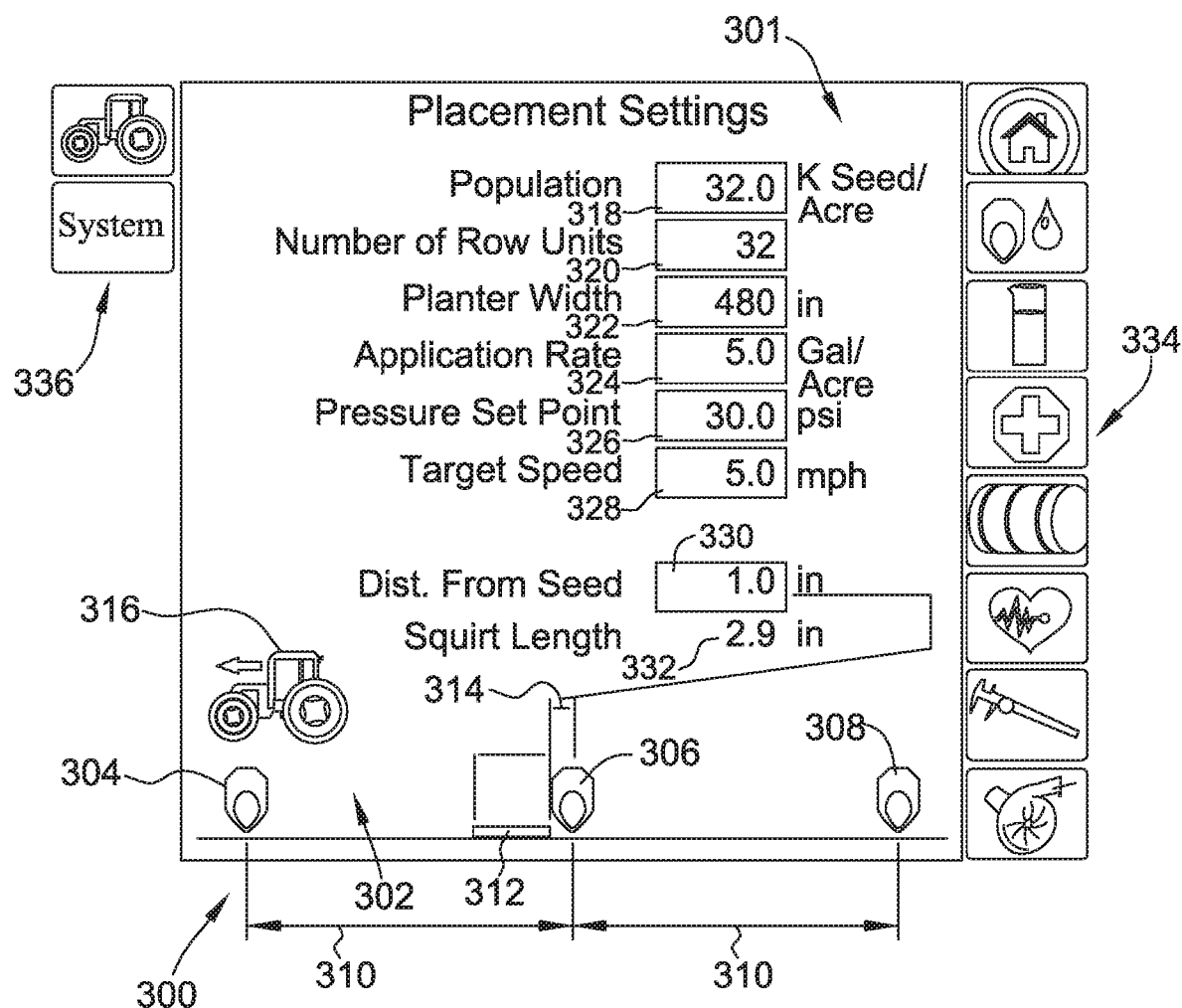
FIG. 4 is a view of a user interface of the seed planting and agricultural spraying system shown in FIGS. 1 and 2.

Referring now to FIG. 4, a user interface display 300 displayed by user interface 406 (shown in FIG. 5) is shown according to one embodiment. User interface display 300 includes a page 301 configured to display and receive information, a navigation toolbar 334 configured to switch between display of different pages 301, and a system toolbar 336 for navigating between different systems of planter 112 and/or row unit 114.

Pages 301 include placement settings page 301. Placement settings page 301 includes a plurality of fields 318, 320, 322, 324, 326, 328, 330, and 332. Placement settings page 301 further includes a graphical representation 302 corresponding to the information in the plurality of fields 318, 320, 322, 324, 326, 328, 330, 332 and a fluid or spray band length (e.g., squirt length) determined by controller 222 and/or the control system of planter 112 (shown in FIG. 5), as described herein with reference to FIGS. 5 and 6.

Fields 318, 320, 322, 324, 326, 328, 330, and 332 are configured to allow for the display and/or entering of information. For example, fields 318, 320, 322, 324, 326, 328, 330, and 332 are selectable by a press on a touch screen of user interface 406 or a click with a cursor controlled by a mouse of user interface 406. Once selected, fields 318, 320, 322, 324, 326, 328, 330, and 332 receive information from a touchscreen keyboard, keyboard, or other device of user interface 406. In alternative embodiments, one or more fields 318, 320, 322, 324, 326, 328, 330, and 332 are replaced by other graphical user interface elements such as drop down menus, a series of radio buttons and corresponding values, sliders, and/or other graphical user interface elements. In some embodiments, squirt length field 332 is not editable and does not receive information, and instead only displays information related to the spray band length (e.g., squirt length) as determined by controller 222 and/or the control system of row unit 114 or planter 112. In other embodiments, squirt length field 332 is editable, and can receive information regarding a length of fluid (e.g., in inches or centimeters) to be applied to each seed.

Population field 318 is configured to allow an operator to enter information regarding the number of seeds 146 (shown in FIG. 2) to be planted. For example, population field 318 allows an operator to enter, using user interface 406, a number of seeds 146 to be planted per acre (or other unit area, such as square meters). Number of row units field 320 is configured to allow an operator to enter information regarding the number of rows of seeds 146 to be planted. For example, number of row units field 320 allows an operator to enter, using user interface 406, a number of row units 114 included in system 100. In other embodiments, number of row units field 320 may be a number of rows field that allows an operator to enter, using user interface 406, a number of rows as a dimensionless value. In yet other embodiments, number of row units field 320 is not editable. Rather, controller 222 and/or the control system of row unit 114 or planter 112 determines the number of rows based on other information using techniques described herein and number of row units field 320 displays this information. Planter width field 322 is configured to allow an operator to enter information regarding the planter width. For example, planter width field 322 allows an operator to enter, using user interface 406, a planter width in inches (or other unit length, such as centimeters or meters). Application rate field 324 is configured to allow an operator to enter information regarding the application rate of fluid F (shown in FIG. 2). For example, application rate field 324 allows an operator to enter, using user interface 406, an application rate of fluid F in gallons per acre (or any other suitable unit volume per unit area). In other embodiments, application rate field 324 allows an operator to enter, using user interface 406, an application rate of fluid F in units of volume per seed, such as milliliters or ounces per seed. Pressure set point field 326 is configured to allow an operator to enter information regarding a desired or target operating pressure of fluid F. For example, pressure set point field 326 allows an operator to enter, using user interface 406, a desired pressure set point of fluid F within manifold 236 (shown in FIG. 3) in pounds per square inch (or other suitable units of pressure). Target speed field 328 is configured to allow an operator to enter information regarding the speed of planter 112 and/or row unit 114. For example, target speed field 328 allows an operator to enter, using user interface 406, a speed in miles per hour or kilometers per hour. Distance from seed field 330 is configured to allow an operator to enter information regarding the distance from seed 146 at which a band of applied fluid F begins (e.g., the distance fluid F, as applied, is offset from seed 146). For example, distance from seed field 330 allows an operator to enter, using user interface 406, a desired offset distance in inches (or other suitable unit length, such as centimeters or meters).

Graphical representation 302 corresponds to the information in the plurality of fields 318, 320, 322, 324, 326, 328, 330, 332 and a spray band length (e.g., squirt length) determined by controller 222 and/or the control system of planter 112 (shown in FIG. 5), and depicts the fluid band length and offset distance graphically (i.e., with a visual graphic). Graphical representation 302 includes first seed graphic 304, second seed graphic 306, third seed graphic 308 (e.g., seed graphics 304, 306, 308 corresponding to seeds 146), a distance 310 between seeds 146, a fluid band length graphic 312, an offset distance graphic 314, and a direction of travel graphic 316. In some embodiments, elements of graphical representation 302 are static, while others are dynamically updated to reflect changes in operating conditions of planter 112, such as the spray band length and the offset distance between spray band and seeds 146. In one embodiment, for example, the location and spacing of seed graphics 304, 306, 308 are static, and the fluid band length graphic 312 and offset distance graphic 314 are updated to reflect changes in spray band length and offset distance. In another embodiment, the distance 310 between seed graphics 304, 306, 308 is updated to reflect changes in the spacing between seeds 146 dispensed by planter 112. In alternative embodiments, graphical representation 302 scrolls or otherwise is active as row unit 114 and/or planter 112 travels.

First seed graphic 304 corresponds to a seed 146 which has not been dispensed and indicates the location where the seed will be dispensed. Alternatively, first seed graphic 304 represents the most recently dispensed seed 146 closest to row unit 114 and/or planter 112 travelling in the direction indicated by travel direction graphic 316. In some embodiments, first seed graphic 304 corresponds to a seed 146 for which a corresponding amount of fluid F has not yet been sprayed. First seed graphic 304 is separated from second seed graphic 306 by distance 310. Second seed graphic 306 corresponds to a seed 146 which has already been dispensed and for which a corresponding amount of fluid F has already been sprayed or a corresponding amount of fluid F is being sprayed. Distance 310 reflects the distance between the two seeds 146. Third seed graphic 308 represents a third seed 146 for which a corresponding amount of fluid F has already been sprayed. Third seed graphic 308 is separated from second seed graphic 306 also by distance 310. In some embodiments distance 310 is to scale and corresponds to the distance between seeds 146 which have been dispensed. In alternative embodiments, distance 310 is not to scale.

Fluid band length graphic 312 corresponds to the value displayed in squirt length field 332. Offset distance graphic 314 corresponds to the value displayed in distance from seed field 330. As the values in their corresponding fields change, fluid band length graphic 312 and offset distance graphic 314 change in length and/or position, relative to second seed graphic 306, within graphical representation 302. Offset distance graphic 314 and fluid band length graphic 312 are shown at scale (e.g., the same scale at which distance 310 is shown). Advantageously, this allows an operator to determine if fluid F is being applied as desired; to change parameters entered in one or more of fields 318, 320, 322, 324, 326, 328, 330, and 332; and to view the effect of the changed parameters on both the fluid band length (e.g., both in length and position relative to seeds 146) and the offset distance. In alternative embodiments, fluid band length graphic 312 and/or offset distance graphic 314 are not shown to scale or are shown at a different scale than that with which distance 310 is shown.

Should the calculated fluid band length graphic 312 become large enough to violate the offset distance graphic 314 of the former or later seeds 146 dropping or to be dropped, associated with seed graphics 308 and 304 respectively, a positive warning graphic is displayed on the user interface graphic 301 giving indication of a possible unintended error condition. This warning allows an operator to change one or more parameters, if desired, to prevent fluid F from being dispensed within an offset distance associated with an adjacent seed 146. For example, controller 222 or the control system of planter 112 (shown in FIG. 5) determines the fluid band length, offset distance, and distance between seeds 146 as described herein. Controller 222 or the control system further determines if the sum of the fluid band length and the offset distance is greater than the distance between seeds 146 such that spraying a first seed (e.g., associated with seed graphic 306) would result in fluid F contacting an adjacent seed 146 (e.g., associated with seed graphic 306). In response to determining that fluid F will come in contact with an adjacent seed 146, controller 222 or the control system causes the user interface to convey a warning. In some embodiments, controller 222 or the control system further determines if the sum of the fluid band length and the offset distance is greater than a threshold value such that spraying a first seed would result in fluid F falling within an offset distance associated with an adjacent seed 146. In response to determining that fluid F will fall within the offset distance of an adjacent seed 146, controller 222 or the control system causes the user interface to convey a warning. In some embodiments, the user interface conveys the warning graphically (e.g., displaying a warning graphic and/or text), through an audible sound (e.g., playing a tone, sound, voice recording, etc.), providing haptic feedback (e.g., a vibration provided via a vibration motor included in the user interface) and/or through other visual, aural, or tactile outputs.

FIG. 5 shows a block diagram of planter 112 according to one embodiment. Control system 400 of planter 112 is coupled to seeder assembly 190, user interface 406, and nozzle assembly 178. Control system 400 is configured to control these and/or other components to perform the functions described herein. Seeder assembly 190 includes motor 72 as described with reference to FIG. 2. Control system 400 controls motor 72 to control the rate at which seeds 146 (shown in FIG. 2) are dispensed and/or otherwise controls seeder assembly 190 to perform the functions described herein. Control system 400 further controls nozzle assembly 178 to perform the functions described herein such as controlling when fluid F (shown in FIG. 2) is sprayed, controlling for what length of time fluid F is sprayed, and/or other functions of nozzle assembly 178 described herein. For example, control system 400 controls valve 182 using pulse width modulation as described herein.

Control system 400 includes processor 402 and memory 404. As described above, processor 402 and memory 404 are configured to cause control system 400 to perform the functions described herein. For example, memory 404 may include programs, instructions, formulas, look up tables, databases, and/or other information which, when executed or otherwise utilized by processor 402, cause performance of the functions of planter 112 and/or row unit 114 described herein.

User interface 406 is configured to receive information from an operator and to provide information to the operator. For example, and without limitation, user interface 406 includes input devices including a keyboard, mouse, touchscreen, joystick(s), throttle(s), buttons, switches, and/or other input devices. For example, and without limitation, user interface includes output devices including a display (e.g., a liquid crystal display (LCD), or an organic light emitting diode (OLED) display), speakers, indicator lights, instruments, and/or other output devices. Control system 400 uses information stored in memory 404 to generate user interface display 300 (shown in FIG. 4) and to receive information from the operator and display information to the operator.

Control system 400 is configured to receive information from user interface 406 including fluid volume information, seed volume information, main pressure information, speed information, and distance from seed information. Fluid volume information is information that control system 400 uses to determine the volume of fluid F to be sprayed on or adjacent to each seed, plant, or other target (e.g., using one or more of the techniques described herein). For example, fluid volume information includes a seed population in thousands of seeds per acre, a number of rows to be sprayed, planter width in inches, an application rate in gallons per acre, and/or other information. Seed volume information is information that control system 400 uses to determine the distance between seeds 146 (e.g., using one or more of the techniques described herein). For example, seed volume information includes a seed population in thousands of seeds per acre, a number of rows to be sprayed, planter width in inches, and/or other information. Main pressure information is information that describes, or is used by control system 400 to determine, a pressure at which fluid F is supplied to nozzle assembly 178 (shown in FIG. 2). For example, main pressure information includes a pressure in pounds per square inch of fluid F in manifold 236 (shown in FIG. 3) that supplies nozzle assembly 178. Speed information is information that describes the speed of row unit 114 and/or planter 112. For example, speed information is a speed in miles per hour. Distance from seed (e.g., offset) information is information that specifies a distance between fluid F as applied and seed 146. For example, distance from seed information is in inches. Distance from seed or offset distance information is used by control system 400 to determine the distance between fluid F, as applied, and seed 146. Control system 400 may also use this information to control valve assembly 178 to spray fluid F such that fluid F, as applied, is offset from seed 146 by the specified distance (e.g., using one or more of the techniques described herein).

Control system 400 is configured to display information to an operator using user interface 406. The information displayed includes fluid squirt length and fluid position relative to at least one seed 146, plant or other target. The information displayed may also include volume information, main pressure information, speed information, and distance from seed information. Control system 400 displays fluid squirt length (e.g., fluid band length) and fluid offset distance graphically (e.g., as depicted in user interface display 300 shown in FIG. 4). Control system 400 calculates a scale at which at least two seeds 146, the fluid band length, and the offset distance may be displayed on a display of user interface 406. Using this scale, control system 400 scales graphics which represent the spray band length and the offset length such that the graphics displayed by user interface 406 depicting this information are to scale. In alternative embodiments, the scale is determined to allow for the display of three seeds 146. The resulting display shows the distance between seeds 146, the fluid band length, and the offset distance at scale. This allows an operator to quickly and easily determine the relationship between seeds 146 and fluid F as will be applied given the current parameters of row unit 114 and/or planter 112. The operator may then alter one or more parameters to achieve a desired application of fluid F relative to seeds 146. For example, the operator may adjust a speed of planter 112, a pressure of fluid F delivered to nozzle assembly 178, operation of valve 182 (e.g., timing, opening percentage, and/or other parameters), change a spray nozzle 234, and/or otherwise adjust other parameters of row unit 114 and/or planter 112.

In one embodiment, control system 400 determines the spray band length of fluid F, e.g., squirt length, using the information received from user interface 406. Control system 400 determines a volume of fluid F to be applied per seed 146 by calculating the quotient of the volume of fluid F per acre and the number of seeds (e.g., population) per acre. Control system 400 calculates the time valve 182 (shown in FIG. 2) remains open to dispense the volume of fluid F per seed 146 based on the main pressure and the known geometry and/or other characteristics of spray tip 234 of nozzle 180 (e.g., the area of the opening of spray tip 234, length and friction loss of spray tip 234, and/or other information). Control system 400 calculates the flow rate of fluid through nozzle 180 using known relationships between pressure and fluid flow rate, such as Bernoulli's equation, and calculates the time that valve 182 remains open by dividing the volume of fluid F per seed 146 by the flow rate. For example, control system 400 calculates the velocity of fluid F through nozzle 180 by taking the square root of the product of 2 and the quotient of main pressure and the density of fluid F. Control system 400 determines the flow rate of nozzle 180 by taking the product of the velocity of fluid F through nozzle 180 and the area of spray tip 234. Control system 400 determines the duration of time during which fluid F is sprayed by calculating the quotient of the volume of fluid F per seed 146 and the flow rate of fluid F through nozzle 180. Control system 400 determines the spray band length of fluid F by taking the product of the duration of time during which fluid F is sprayed and the velocity, e.g., speed, of row unit 114 and/or planter 112. In alternative embodiments, control system 400 calculates the spray band length using the area of nozzle 180 rather than the area of spray tip 234.

In some embodiments, control system 400 further applies a scaling factor to determine the spray band length. For example, control system 400 determines an initial spray band length using the technique described above. Control system 400 determines the spray band length of fluid F by taking the product of the initial spray band length and the scaling factor. The scaling factor modifies the initial spray band length to account for factors such as a check valve included in valve assembly 178 and/or spraying assembly 210, spray tip 234 included in valve assembly 178, and/or other factors. The scaling factor may be selected based on specific equipment parameters (e.g., identification by the operator of the type of spray tip 234 using user interface 406). For example, and without limitation, the scaling factor may be less than 1, greater than 1, within a range from 0.5 to 2, or any other suitable value. In some embodiments, the scaling factor is 1.3, 1.5, 1.7, or 2.0.

In some embodiments, control system 400 accounts for a type of spray tip 234 and/or parameters describing the spray pattern produced by spray tip 234 in determining the velocity of fluid F, the spray band length, and/or the scaling factor. For example, control system 400 uses information about spray tip 234 received from user interface 406 and entered by an operator (e.g., using page 601 shown in FIG. 7).

In alternative embodiments, other suitable techniques are used to calculate or otherwise determine the squirt length of fluid F. For example, control system 400 may use a look up table and the received information to determine the squirt length of fluid F.

Control system 400 also determines a distance between seeds 146 in a single furrow 138 (shown in FIG. 2). Control system 400 determines the distance between seeds based on the population of seeds, number of rows, and the planter width. For example, control system 400 determines the quotient of the population of seeds and the number of rows (e.g., determined based on the planter width). The distance between seeds 146, e.g., the seed spacing, is a function of seed population and row spacing.

Figure 6:
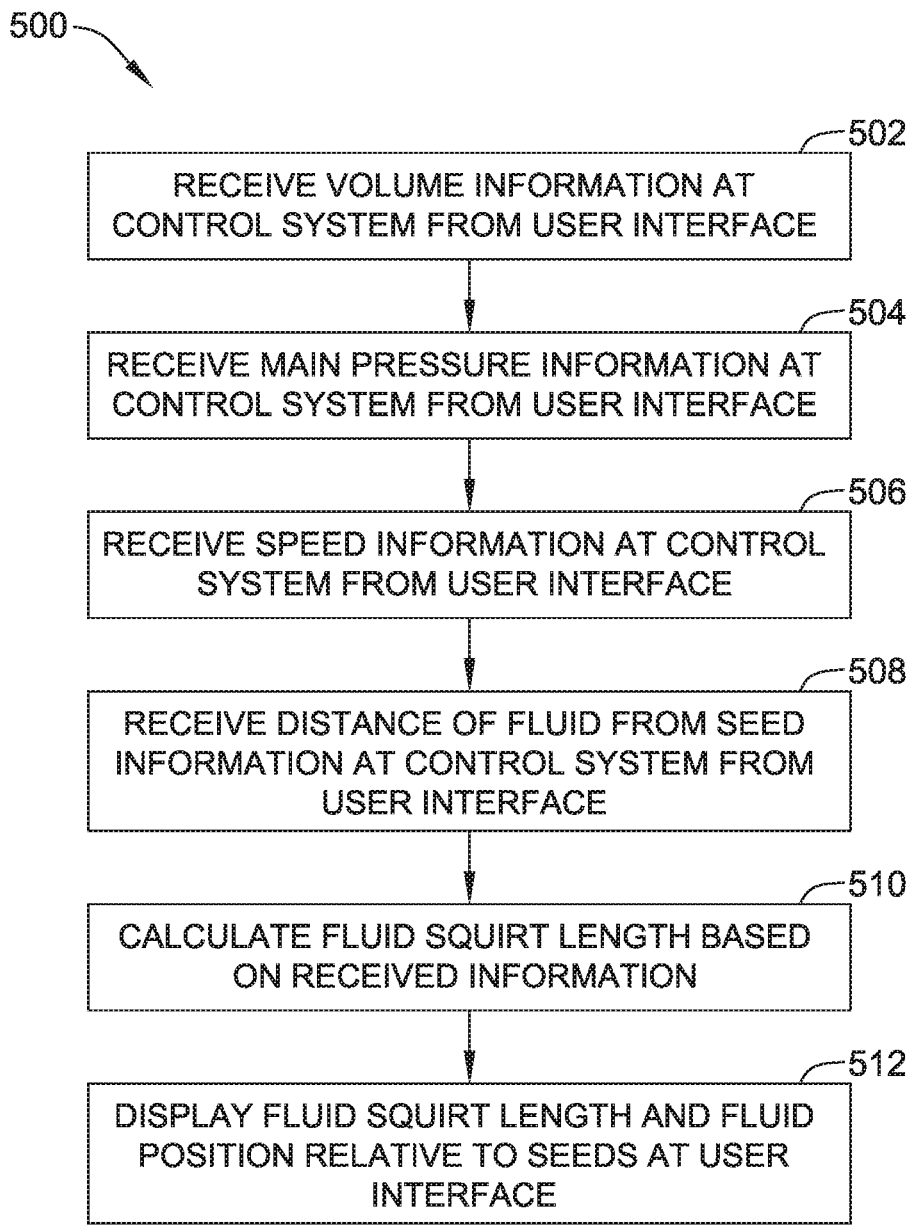
FIG. 6 is a flow chart of a method of determining and visually depicting spray band length of the seed planting and agricultural spraying system shown in FIGS. 1 and 2.

FIG. 6 shows an exemplary process 500 for determining a spray band length of fluid F and determining a position of the spray of fluid F relative to seed 146 (shown in FIG. 2), e.g., the offset distance between seed 146 and the coverage of fluid F on the ground. Control system 400 (shown in FIG. 5) receives 502 volume information (e.g., fluid volume information and/or seed volume information) from user interface 406 (shown in FIG. 5). Volume information is information that control system 400 uses to determine the volume of fluid F to be sprayed on or adjacent to each seed, plant, or other target (e.g., using one or more of the techniques described herein). Volume information is also information that control system 400 uses to determine the distance between seeds 146 (e.g., using one or more of the techniques described herein). For example, volume information includes a seed population in thousands of seeds per acre, a number of rows to be sprayed, planter width in inches, an application rate in gallons per acre, and/or other information. Control system 400 receives 504 main pressure information from user interface 406. Main pressure information is information that describes, or is used by control system 400 to determine, a pressure at which fluid F is supplied to nozzle assembly 178 (shown in FIG. 2). For example, main pressure information includes a pressure in pounds per square inch of fluid F in manifold 236 (shown in FIG. 3) that supplies nozzle assembly 178. Control system 400 receives 506 speed information from user interface 406. Speed information is information that describes the speed of row unit 114 and/or planter 112. For example, speed information is a speed in miles per hour. Control system 400 receives 508 a distance of fluid F from seed 146 (e.g., an offset distance). This offset distance is used by control system 400 to determine the distance between fluid F, as applied, and seed 146. Control system 400 may also use this information to control valve assembly 178 to spray fluid F such that fluid F, as applied, is offset from seed 146 by the specified distance (e.g., using one or more of the techniques described herein).

Based on at least the volume information, main pressure information, and speed information, control system 400 calculates 510, or otherwise determines, a fluid squirt length of fluid F (e.g., the length of fluid F as applied to the ground). Control system 400 uses one or more of the techniques described herein to determine the squirt length. For example, control system 400 determines a volume of fluid F to be applied per seed 146 by calculating the quotient of the volume of fluid F per acre and the number of seeds (e.g., population) per acre. Control system 400 calculates the time valve 182 (shown in FIG. 2) remains open to dispense the volume of fluid F per seed 146 based on the volume of fluid F per seed, the main pressure, and the known geometry and/or other characteristics of spray tip 234 or nozzle 180 (e.g., the area of the opening of spray tip 234, length and friction loss of spray tip 234, and/or other information). Control system 400 then calculates the spray band length (e.g., squirt length) based on the time valve 182 remains open and the speed information (e.g., velocity of row unit 114 and/or planter 112).

Control system 400 displays 512 the fluid squirt length and fluid position relative to at least one seed 146, plant or other target using user interface 406. The fluid position relative to seed 146 (e.g., offset distance) is determined by control system 400 using the input of distance of fluid F from seed 146 and the fluid squirt length. In some embodiments, control system 400 displays the fluid squirt length and offset distance relative to a plurality of seeds 146. The distance between seeds 146 is determined, as described herein, based on the volume information received from user interface 406. In some embodiments, control system 400 displays the fluid squirt length and offset distance at scale. This allows an operator to visually determine the relationship between multiple seeds 146 and fluid F as applied to seeds 146.

Figure 7:
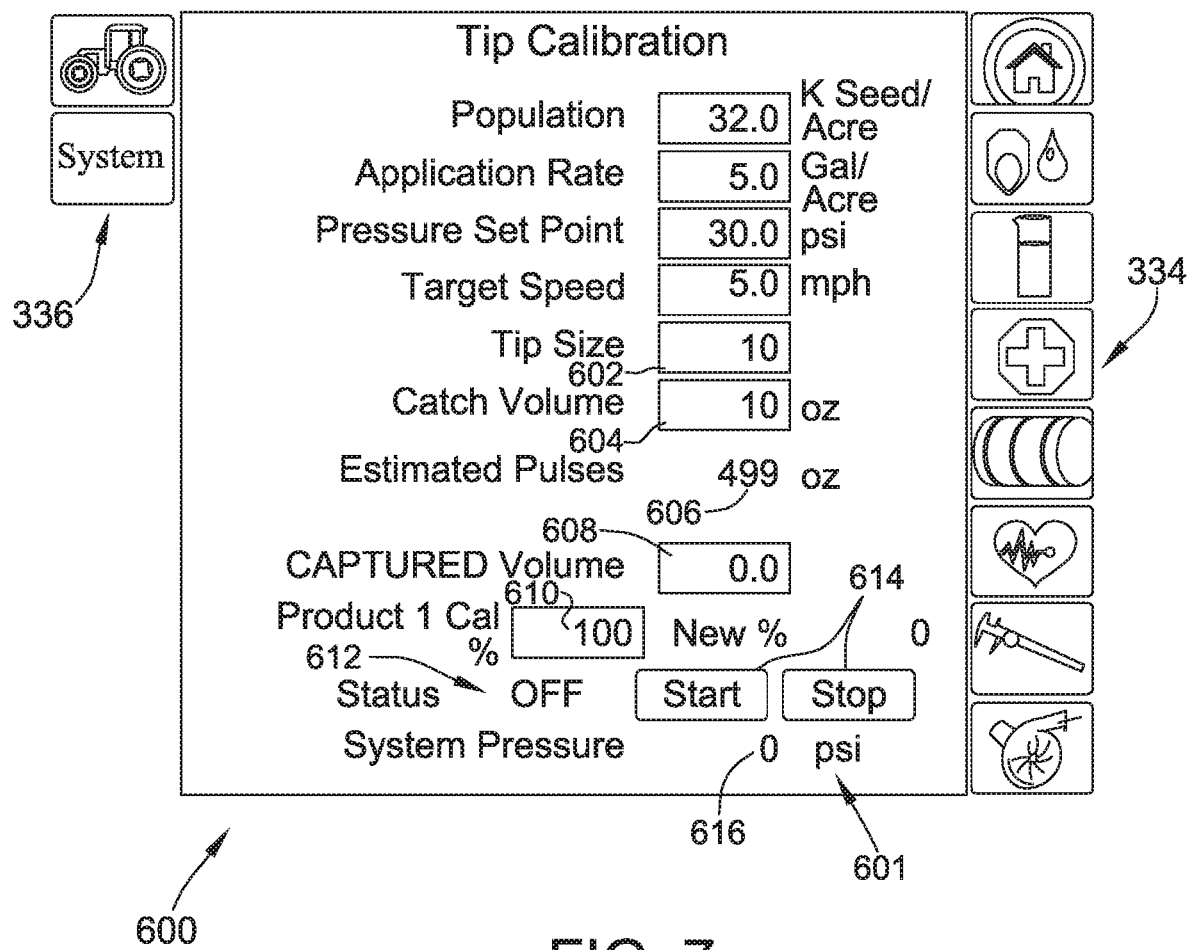
FIG. 7 is another view of the user interface of the seed planting and agricultural spraying system shown in FIGS. 1 and 2.

Referring now to FIG. 7, user interface display 300 (shown in FIG. 4) includes page 601 for receiving tip calibration information and/or performing a tip calibration of spray tip 234 (shown in FIG. 3). An operator may navigate to page 601 using system toolbar 336 and/or navigation toolbar 334.

Page 601 includes a plurality of fields 602, 604, 606, 608, and 610. Page 601 further includes status graphic 612 and start/stop buttons 614. Tip size field 602 receives information from an operator which identifies the size of spray tip 234. For example, tip size field 602 receives a tip size in dimensionless units. The tip size may be an industry standard describing spray tip 234 and/or otherwise describes the tip size of spray tip 234. Catch volume field 604 receives information from an operator which identifies a catch volume associated with spray tip 234. For example, the catch volume may correspond to a single spray from spray tip 234 in ounces. Estimated pulses field 606 is not editable. Estimated pulses field 606 displays estimated pulses which are a catch volume and/or volume per seed 146. For example, 0 to 1 ounces, 0.01 to 0.1 ounces, greater than one ounce, 0.01 ounces, 0.02 ounces, 0.03 ounces, 0.04 ounces, 0.1 ounces, or any other amount of fluid F may be applied per seed 146. The estimated pulses field 606 value is determined, by control system 400 (shown in FIG. 5), based at least on the tip size and catch volume (e.g., known catch volume or a catch volume determined by calibration as described below).

It may also be determined using population, application rate, pressure set point, and/or target speed information (e.g., entered in and carried over from page 301 shown in FIG. 4).

Captured volume field 608 allows an operator to calibrate a specific spray tip 234. For example, captured volume field allows an operator to enter a captured volume amount in ounces corresponding to a spray from spray tip 234. The spray is initiated using start/stop buttons 614 which cause nozzle assembly 178 (shown in FIG. 2) to spray one spray of fluid F from spray tip 234. Status field 612 displays whether or not nozzle assembly 178 is spraying. System pressure field 616 shows the pressure of nozzle assembly 178 in pounds per square inch. This is the pressure for which spray tip 234 is calibrated. Based on the captured volume, system pressure, and/or other information, control system 400 determines a new calibration percentage shown in product calibration field 610. Product calibration field 610 may also allow an operator to manually enter a calibration percentage. Control system 400 uses the calibration percentage in determining other parameters related to nozzle assembly 178, row unit 114, and/or planter 112 (e.g., as discussed with reference to FIG. 5). In alternative embodiments, tip calibration as described herein uses more than one spray or pulse of fluid F from spray tip 234. For example, start/stop buttons 614 initiate a predetermined number of a plurality of sprays/pulses from spray tip 234. Using the number of sprays/pulses and the total captured volume, spray tip 234 is calibrated using a plurality of sprays/pulses.

In alternative embodiments, some information is measured, received from other systems, or determined. For example, main pressure information may be measured using one or more pressure sensors. Speed information may be measured, received from another control system or a subsystem of control system 400 of planter 112, or determined from other information.

Although seed planting and agricultural spraying system 112 is described herein with reference to spraying seeds 146, planter 112 may generally be utilized to spray any suitable type of plant and/or plant precursor, such as seeds, seedlings, transplants, encapsulated tissue cultures and/or any other suitable plant precursors. In some embodiments, planter 112 may not plant seed 146 and/or may not be configured to plant seeds 146, and instead may be configured to spray fluid F on and/or adjacent to existing seeds, plants, or other targets.

Embodiments of the methods and systems described may more efficiently apply fluids to surfaces compared to prior methods and systems. For example, the systems and methods described provide for determination of a spray band length and offset distance relative to a target. Moreover, the system facilitates conveyance of this information to an operator through use of a user interface system.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A spraying system for spraying a fluid comprising:
   a nozzle configured to spray the fluid on or adjacent to a target;
   a valve connected in fluid communication with the nozzle and configured to control fluid flow through the nozzle in response to receiving a control signal;
   a sensor configured to transmit a detection signal upon detection of the target;
   a user interface configured to receive application rate information and target population information from an operator; and
   a control system communicatively coupled to the user interface, the sensor, and the valve, the control system configured to:
      determine a specific volume of fluid per target to be dispensed by the valve based on the application rate information and the target population information input to the user interface; and
      transmit the control signal to the valve at least in part in response to receiving the detection signal, wherein the control signal actuates the valve such that the determined specific volume of fluid per target is sprayed by the nozzle on or adjacent to the target.

2. The spray system of claim 1, wherein the control system is configured to determine the specific volume of fluid per target by calculating the quotient of the application rate information and the target population information, wherein the application rate information is a volume of fluid per area, and wherein the target population information is a number of targets per area.

3. The spraying system of claim 1, wherein the sensor is at least one of:
   a beam break sensor, positioned to detect seeds dispensed by a seed tube;
   and a camera.

4. The spraying system of claim 1, wherein the target is at least one of a seed, a seedling, a transplant, or an encapsulated tissue culture.

5. The spraying system of claim 1, wherein the fluid is at least one of a fertilizer, a pesticide, an insecticide, a fungicide, a growth promoter, or growth regulator.

6. The spraying system of claim 1, wherein the control system is further configured to determine a spray duration that the valve is opened to achieve the specific volume of fluid per target, based on the specific volume of fluid per target and a determined flow rate of fluid through the nozzle.

7. The spraying system of claim 6, wherein the control system is further configured to determine a spray band length of fluid to be dispensed from the nozzle based on the spray duration and a travel speed of the spraying system, wherein the user interface displays a graphic representation of the determined spray band length relative to the target.

8. The spraying system of claim 7, wherein the control system is further configured to determine an offset distance of the spray band length from the target, wherein the user interface displays a graphic representation of the offset distance relative to the target.

9. The spraying system of claim 8, wherein the user interface is configured to display the spray band length and the offset distance to scale relative to a distance between two adjacent targets, the user interface further configured to display two images corresponding to the two adjacent targets a distance apart at the same scale.

10. A method for applying fluid on or adjacent to a target using a spraying system including a nozzle and a valve connected in fluid communication with the nozzle, the method comprising:
receiving, at a control system communicatively coupled to the valve, target population information and application rate information from a user interface communicatively coupled to the control system;
determining, by the control system, a specific volume of fluid per target to be dispensed by the nozzle based at least in part on the target population information and the application rate information received from the user interface;
receiving, at the control system, a detection signal from a sensor, the detection signal transmitted in response to the sensor detecting the target; and
controlling, using the control system, actuation of the valve at least in part in response to receiving the detection signal such that the determined specific volume of fluid per target is sprayed by the nozzle on or adjacent to the target.

11. The method of claim 10, wherein determining the specific volume of fluid per target further comprises calculating the quotient of the application rate information and the target population information, wherein the application rate information is a volume of fluid per area, and wherein the target population information is a number of targets per area.

12. The method of claim 10 further comprising determining a spray duration that the valve is opened to achieve the specific volume of fluid per target, based on the specific volume of fluid per target and a determined flow rate of fluid through the nozzle.

13. The method of claim 12 further comprising:
determining, using the control system, a spray band length of fluid to be dispensed from the nozzle based on the spray duration and a travel speed of the spraying system; and
displaying, on the user interface, a graphic representation of the determined spray band length relative to the target.

14. The method of claim 13 further comprising:
determining, using the control system, an offset distance of the spray band length from the target; and
displaying, on the user interface, a graphic representation of the offset distance relative to the target.

15. The method of claim 14, wherein displaying the graphic representation of the spray band length and the offset distance comprises displaying the graphic representation to scale relative to a distance between two adjacent targets, and displaying two images corresponding to the adjacent targets a distance apart at the same scale.

16. A planter system for planting seeds and spraying a fluid, the planter system comprising:
a seeder assembly including a seed meter configured to dispense seeds through a seed tube;
a nozzle configured to spray the fluid on or adjacent to a target seed;
a valve connected in fluid communication with the nozzle and configured to control fluid flow through the nozzle in response to receiving a control signal;
a sensor configured to transmit a detection signal upon detection of the target seed;
a user interface configured to receive application rate information and seed population information from an operator; and
a control system communicatively coupled to the user interface, the sensor, and the valve, the control system configured to:
determine a specific volume of fluid per seed to be dispensed by the nozzle based on the application rate information and the seed population information input to the user interface; and
transmit the control signal to the valve at least in part in response to receiving the detection signal, wherein the control signal actuates the valve such that the determined specific volume of fluid per seed is sprayed by the nozzle on or adjacent to the target seed dispensed from the planter system.

17. The planter system of claim 16, wherein the control system is configured to determine the specific volume of fluid per seed by calculating the quotient of the application rate information and the seed population information, wherein the application rate information is a volume of fluid per area, and wherein the seed population information is a number of seeds per area.

18. The planter system of claim 16, wherein the control system is further configured to determine a spray duration that the valve is opened to achieve the specific volume of fluid per seed, based on the specific volume of fluid per seed and a determined flow rate of fluid through the nozzle.

19. The planter system of claim 18, wherein the control system is further configured to determine a spray band length of fluid to be dispensed from the nozzle based on the spray duration and a travel speed of the planter system, wherein the user interface displays a graphic representation of the determined spray band length relative to the target.

20. The planter system of claim 19, wherein the control system is further configured to determine an offset distance of the spray band length from the target seed, wherein the user interface displays a graphic representation of the offset distance relative to the target seed.

* * * * *